US006122633A

United States Patent [19]
Leymann et al.

[11] Patent Number: 6,122,633
[45] Date of Patent: Sep. 19, 2000

[54] SUBSCRIPTION WITHIN WORKFLOW MANAGEMENT SYSTEMS

[75] Inventors: Frank Leymann, Aidlingen; Dieter Roller, Schonaich, both of Germany

[73] Assignee: International Business Machines Corporation, Armonk, N.Y.

[21] Appl. No.: 09/062,880

[22] Filed: Apr. 20, 1998

[30] Foreign Application Priority Data

May 27, 1997 [EP] European Pat. Off. .............. 97108496

[51] Int. Cl.[7] .............................. G06F 17/30; G06F 17/60; G06F 13/00
[52] U.S. Cl. ................................. 707/10; 707/1; 707/10; 707/103; 707/200; 705/4; 705/8; 705/9; 709/313
[58] Field of Search .................................. 707/1, 10, 100, 707/104, 202; 705/1, 8, 9, 4, 7; 709/101, 201, 313; 345/329, 334

[56] References Cited

U.S. PATENT DOCUMENTS

| | | | |
|---|---|---|---|
| 5,125,075 | 6/1992 | Goodale et al. | 395/200 |
| 5,574,898 | 11/1996 | Leblang et al. | 707/1 |
| 5,634,127 | 5/1997 | Cloud et al. | 709/313 |
| 5,745,901 | 4/1998 | Entner et al. | 707/103 |
| 5,826,239 | 10/1998 | Du et al. | 705/8 |
| 5,870,545 | 2/1999 | Davis et al. | 395/200.95 |
| 5,937,388 | 8/1999 | Davis et al. | 705/8 |
| 5,940,829 | 8/1999 | Tsuiki et al. | 707/10 |
| 5,950,169 | 9/1999 | Borghesi et al. | 705/4 |
| 5,960,420 | 9/1999 | Leymann et al. | 707/1 |
| 6,009,405 | 12/1999 | Leymann et al. | 705/9 |
| 6,014,673 | 1/2000 | Davis et al. | 707/202 |
| 6,041,306 | 3/2000 | Du et al. | 705/8 |

OTHER PUBLICATIONS

Boone, Elisabeth., "Work smart & safe with workflow & technical audits", Rough Notes; Indianapolis; Apr. 1998.

Katsumata, Masashi et al., "Modeling for interworkflow on autonomous decentralized hetrogeneous environment", IEEE SMC '99 Conference Proceedings of the 1999 IEEE International Conference on Systems, Man, and Cybernetics, 1999., Oct. 12–15, 1999. Vol. 1, p.

Manmin, Xia et al., "Cooperative Software Agents for Workflow Management System", APCC/OECC '99. Fifth Asia–Pacific Conference on Communications and Fourth Optoelectronics and Communications Conference, 1999., vol. 2, pp. 1063–1067, Feb. 1999.

(List continued on next page.)

*Primary Examiner*—Hosain T. Alam
*Assistant Examiner*—Shahid Alam
*Attorney, Agent, or Firm*—Scully, Scott, Murphy & Presser; Wayne L. Ellenbogen, Esq.

[57] ABSTRACT

The present invention relates to the area of workflow management systems (WFMS). More particularly the inventions extends WFMS by subscription means. The subscription means operate on an audit trail stored within a database. The subscription means may encompass a multitude of subscription monitors. Subscription monitors allow to subscribe to the audit trail, i.e. to formulate certain interests as subscription selectors on information entered into the audit trail. A subscription monitor autonomously checks the audit trail for subscribed audit records. If such audit records have been determined the subscription monitor executes a subscription actuator, i.e. a pre-defined program. The subscription actuator may inform the subscriber on the subscribed audit record or may start any type of program. The current invention teaches to implement the subscription monitors as database triggers of the database storing the audit trail. The subscription selectors are realized as search conditions of the database trigger. Finally the subscription actuator can be implemented according the current teaching as user-defined functions of the database.

4 Claims, 1 Drawing Sheet

```
1  CREATE TRIGGER    SUBSCRIPTION
2                    AFTER
3                    INSERT ON AUDIT
4                    REFERENCING NEW AS N
5                    FOR EACH ROW MODE DB2SQL
6                    WHEN (N.USER_FIELD > 10000 AND
7                          N. ACTIVITY = `APPROVAL' AND
8                          N. MODEL_NAME = 'LOAN')
9                    VALUES (SUBSCRIBE(N.USER,
10                                     N.USER_VALUE,
11                                     N.INSTANCE_NAME)
```

OTHER PUBLICATIONS van Sinderen, Marten et al., "Workflow automation based on OSI job transfer and manipulation", Computer Standards & Interfaces, vol.: 21, Issue: 5, Dec. 1999, pp. 403–415.

D.J. Spoon, "Project Management Environment", IBM Technical Disclosure Bulletin, vol. 32, No. 9A, pp. 250–254, (Feb. 1990).

R.T. Marshak, "IBM FlowMark, Object–Oriented Workflow for Mission–Critical Applications", Workgroup Computing Report (USA), vol. 17, No. 5, pp. 3–13 (1994).

H.A. Inniss and J.H. Sheridan, "Workflow Management Based on an Object–Oriented Paradigm", IBM Technical Disclosure Bulletin, vol. 37, No. 3, p. 185, Mar. 1994.

F. Leymann and D. Roller: "Business Process Management with FlowMark", Digest of papers, Cat. No. 94CH3414–0, Spring COMPCON 94, (1994).

F. Leyman, "A Meta Model to Support the Modelling and Execution of Processes", Proceedings of the 11th European Meeting on Cybernetics and System Research EMCR92, Vienna, Austria, Apr. 21–24, World Scientific, pp. 287–294 (1992).

The "IBM FlowMark for OS/2", document number GH 19–8215–01, IBM Corporation, (1994).

F. Leymann and W. Altenhuber: "Managing Business Processes as an Information Resource", IBM Systems Journal, vol. 32(2) (1994).

D. Roller, "Verification Von Workflows in IBM FlowMark", Geschaeftsprozessmodellierung und Workflows, International Thompson Publishing, (1995).

```
1 CREATE TABLE AUDIT (
2     TIME              TIMESTAMP    NOT NULL ,
3     EVENT             INTEGER      NOT NULL ,
4     USER              CHAR (32)    NOT NULL ,
5     MODEL_NAME        CHAR (32)    NOT NULL ,
6     INSTANCE_NAME     CHAR (32)    NOT NULL ,
7     ACTIVITY          CHAR (32)  ,
8     USER_FIELD        INTEGER
9     )
```

FIG. 1

```
1  CREATE TRIGGER   SUBSCRIPTION
2                   AFTER
3                   INSERT ON AUDIT
4                   REFERENCING NEW AS N
5                   FOR EACH ROW MODE DB2SQL
6                   WHEN (N.USER_FIELD > 10000 AND
7                         N. ACTIVITY = `APPROVAL' AND
8                         N. MODEL_NAME = 'LOAN')
9                   VALUES (SUBSCRIBE(N.USER,
10                                    N.USER_VALUE,
11                                    N.INSTANCE_NAME)
```

FIG. 2

```
1  CREATE FUNCTION   SUBSCRIBE (CHAR (32) ,
2                               INTEGER) ,
3                               CHAR (32) )
4                    RETURNS INTEGER
5                    EXTERNAL NAME 'SUBSCRIB.EXE'
6                    LANGUAGE C
7                    PARAMEER STYLE DB2SQL
8                    NOT VARIANT
9                    FENCED
10                   NOT NULL CALL
11                   NO SQL
12                   EXTERNAL ACTION
13                   NO SCRATCHPAD
14                   NO FINAL CALL
```

FIG. 3

SUBSCRIPTION WITHIN WORKFLOW MANAGEMENT SYSTEMS

BACKGROUND OF THE INVENTION

1. Technical Field

The present invention relates to the field of computer systems acting as workflow management systems (WFMS).

2. Prior Art

A new area of technology with increasing importance is the domain of Workflow-Management-Systems (WFMS). WFMS support the modelling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e. g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Applications", Workgroup Computing Report (USA), Vol. 17, No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modelling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

In F. Leymann: "A meta model to support the modelling and execution of processes", Proceedings of the 11th European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities; refer for instance to "Modeling Workflow", document number SH 19-8241, IBM Corporation, 1996. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resource", IBM Systems Journal, Vol. 32(2), 1994, the mathematical theory underlying the IBM FlowMark product is described.

In D. Roller: "Verifikation von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

Another area of the technology relates to techniques of subscribing information. The idea of subscriptions is becoming more and more popular with the users of computer systems, in particular, with the increasing amount of information available. Users must no longer periodically query for new information. The appropriate computer systems offer the user the capability to subscribe once to the system and specify upon which event or which type of information they would like to be notified. The computer system then takes over the responsibility to monitor events or information with respected to said subscribed, i.e. selected, events or information and then autonomously inform the subscriber.

WFMSs manage the execution of business processes. These business process typically are performed in a distributed environment. Typically workflow management system write an audit trail. This audit trail contains a record for each major event, such as start or termination of a process or an activity. The audit trail of WFMS represents a huge potential source of information lacking any teaching for a subscription technology on certain information elements within the audit trail.

SUMMARY OF THE INVENTION

The present invention is based on the objective to extend workflow management systems by a subscription component. More specifically, the present invention is directed to a subscription-means as part of or as separate extension to a workflow-management-system (WFMS), said WFMS comprising an audit-trail of said WFMS stored within a database, said audit-trail encompassing a multitude of audit-records representing a protocol of events occurred during the execution of the WFMS, wherein said subscription-means comprises at least one subscription-monitor to autonomously process subscribed-audit-records, said subscription-monitor comprising a subscription-selector and a subscription-actuator, wherein said subscription-monitor is implemented as a database-trigger for said audit-trail and said subscription-selector is a search condition identifying said subscribed-audit-records, and wherein said subscription-actuator is processed if subscribed-audit-records have been identified.

The present invention assumes a workflow management system (WFMS) comprising an audit-trail stored within a database encompassing a multitude of audit records. These audit trail represents a protocol of events occurred during the execution of the WFMS. The present invention teaches subscription means comprising one or a multitude of subscription monitors. A subscription monitor allows to subscribe to certain audit records. A subscription monitor comprises a subscription selector and a subscription actuator. The subscription monitor autonomously processes subscribed audit records. According to the present teaching, a subscription monitor is implemented as a database trigger for said audit trail and a subscription selector is realized as a search condition identifying subscribed audit records. Finally, the subscription actuator processes each of the subscribed audit records generating the subscription result.

The technique proposed by the present invention minimizes the implementation effort for the subscription means as the teaching exploits and combines as far as possible various database features. At the same time this approach results in a performance improved implementation. As subscription monitors are implemented based on database triggers they operate within the database, i.e. directly at the place where the audit trail is stored. As subscription monitors can be implemented within the database, i.e. outside the WFMS, this approach does not require any changes to the WFMS. Moreover, as subscription monitors are implemented outside the WFMS, subscriptions become effective immediately; that means even for running process instances within the WFMS. Finally the implementation approach of the current teaching allows for the definition any number of subscription monitors and any number of these subscription monitors may be processed in parallel.

The present invention further allows for additional processing of the subscribed audit records by a subscription actuator. Thus, they may be processed to generate some sort of condensed subscription result. For instance the subscriber may receive a summary of certain changes happened within the audit trail since the last subscription response.

The present invention further relates to the implementation of a subscription actuator as a user defined function within said database. The advantages of this approach are manyfold. Again this minimizes the implementation effort for the subscription means as the teaching exploits the database feature of user defined function. Similar to what has been outlined above performance has been improved as the execution takes place within the database, i.e. directly at the place where the audit trail is stored. In addition within user defined functions an implementation is not restricted to the execution of certain database routines. Instead any activity may executed like in a general program.

Further, a subscription actuator once started because subscribed audit records have been identified sends a message to the subscriber on the audit records. Alternatively, a subscription monitor may start a process instance within said WFMS.

BRIEF DESCRIPTION OF THE DRAWINGS

Preferred embodiments of the present invention will now be described, by way of example only, with reference to the accompanying drawing, in which:

FIG. 1 is a diagram reflecting an assumed layout of an audit trail record stored within the audit trail which in turn is stored within a database.

FIG. 2 is a visualization of an example of a subscription monitor implemented as a database trigger.

FIG. 3 reflects an example of the specifications of a subscription actuator implemented as a user-defined function within the database.

DETAILED DESCRIPTION OF THE PREFERRED EMBODIMENTS OF THE INVENTION

The present invention is illustrated based on IBM's Flow-Mark workflow management system. Of course any other WFMS could be used instead. Furthermore the current teaching applies also to any other type of system which offers WFMS functionalities not as a separate WFMS but within some other type of system.

Though the current description of the invention is based on a relational database system this is just meant as an example. Of course any other database system may be used instead.

Moreover if the current description is discussing a single subscription monitor this is not a conceptual limitations. Actually any number of subscription monitors may be defined and active in parallel within the system.

A subscription system according to the current teaching may be realized as part of a WFMS or as a separate component. Though this description is favoring the first approach this is not a limitation of the technical teaching.

The following is a short outline on the basic concepts of a workflow management system based on IBM's FlowMark WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process

Of course multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to true. Default connectors enable the workflow model to cope with exceptional events. Data connector specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity need to be allowed to become interrupted. Thus, termination of an activity does not necessarily indicate that the associated task has been finished successfully. In order to allow the measurement of successfullness of the work performed by an activity a Boolean expression called exit condition is associated with each activity. Exactly the activities the exit condition of which evaluated to true in the actual context are treated as successfully terminated. For determination of the actual control flow precisely the successfully terminated activities are considered. Thus the logical expression of an exit condition, if specified, must evaluate to true for control to pass from an activity or block.

Beside describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

The idea of subscriptions is becoming more and more popular with the users of computer systems, in particular, with the increasing amount of information available. Users must no longer periodically query for new information. The appropriate computer systems offer the user the capability to subscribe once to the system and specify upon which event or which type of information they would like to be notified. The computer system then takes over the responsibility to monitor events or information with respected to said subscribed, i.e. selected, events or information and then autonomously inform the subscriber. Thus the appropriate computer systems offer the user the capability to subscribe to the system and specify upon which event they would like to be notified.

WFMS manage the execution of business processes. These business process typically are performed in a distributed environment. Typically workflow management system write an audit trail. This audit trail contains a record for each major event, such as start or termination of a process or an activity.

Using the audit trail as a base, subscription can be offered by a workflow management system without any change to the workflow management system itself by exploiting the trigger and user-defined function mechanism of the relational database management system in which the audit trail is stored.

The main purpose of the audit trail is to capture the history of the execution of a process instance. Thus an audit trail represents a type of execution protocol of the process models executed by the WFMS. Most workflow management systems store the audit trail directly into a relational database.

The Workflow Management Coalition is in the process of standardizing the audit trail.

In the following we summarizes some of the fields to be found in such an audit trail. The WFMS write such an audit trail record for each encountered event.

Timestamp

Date and time the event took place.

Event

Type of the event that caused the audit trail to be written. Typical events are start of a process, termination of a process, start of an activity, or termination of an activity. Also events of any type occurring during execution of a certain activity are candidates for the audit trail. In such a case the activity itself would generate an audit trail. Thus for current invention it is not important which component is actually generating the event and therefore the audit trail record. This may be done by the WFMS itself or any other program.

User

Identification of the user who performed or initiated the event.

Process Model Name

Name of the process model. Each process model is uniquely identified via this name.

Process Instance Name

Identification of the process instance. Each process is uniquely identified via this name.

Activity Name

Name of the activity. Each activity within a process model is uniquely identified via the name. This field is populated if the event is associated with an activity.

Associated Object Identifier

Uniquely identifies the object associated with the event. This could be the identifier of a work item, of an active instance, or the process instance. This identifier can be used to access the object using the workflow managements application programming interface.

User Field

Contains the value of user field. User fields provide a mechanism to store import user data that is associated with a process instance in the audit trail. A typical example is a customer number or the amount of a loan.

Basically all relation database management systems offer triggers. A trigger defines a set of actions that are executed or triggered by, a 'delete', 'insert', or 'update' operation on a specified table stored within the database. When such an SQL operation is executed, the trigger is said to be activated.

Triggers are defined using the CREATE TRIGGER statement. There are a number of criteria that are defined when creating a trigger which are used to determine when a trigger should be activated.

The subject table defines the table for which the trigger is defined.

The trigger event defines a specific SQL operation that modifies the subject table. The operation could be 'delete', 'insert', or 'update'. Thus the trigger event is that particular event defined to activate a certain action depending on a certain or a set of certain previous actions.

The trigger activation time defines whether the trigger should be activated before or after the trigger event is performed on the subject table.

The statement that causes a trigger to be activated will include a set of affected rows. These are the rows of the subject table that are being deleted, inserted, or updated. Or in other words, the set of effected rows comprise those rows within the subject table which have been manipulated according the specifications of the trigger event. The trigger granularity defines whether the actions of the trigger will be performed once for the statement or once for each of the rows in the set of affected rows.

The triggered action consists of an optional search condition and a set of SQL statements that are executed whenever the trigger is activated. The SQL statements are only executed if the search condition evaluates to true.

The SQL statements can include statements that 'select', 'update', 'insert' or 'delete' tables. It also can include user-defined database functions. Moreover certain tapes of databases may allow or can be extended to execute not only SQL statements but allow execution for any type of program.

The triggered action may refer to values in the set of affected rows. This is supported through the use of transition variables. Transition variable use the names of the columns in the subject table qualified by a specified name that the identifies whether the reference is the old value (prior to the update) or the new value (after the update). Another means of referring to the values in the set of affected rows is using transition tables. Transition tables also use the names of the columns of the subject table but have a name specified that allows the complete set of affected rows to be treated as a table. As with transition variables, a transition table can be defined for the old values and the new values but only in after triggers.

Multiple triggers can be specified for a combination of table, event, or activation time. The order in which the triggers are activated is the same as the order in which they are created.

A detailed description of triggers as implemented by IBMs relational database management system DB2 for common server can be found in 'IBM Database 2 SQL Reference—for common server', Version 2, 1995 (available through IBM branch office).

User-defined functions are new additions to relational database systems. A database function is a relationship between a set of input data values and a result value. For example, the TIMESTAMP function can be passed input data values of DATE and TIME and the result is a TIMESTAMP. Functions can be either built-in or user-defined.

Built-in functions are provided with the database manager providing a single result value. Examples of such functions include column functions such as AVG, operator functions such as "+", casting functions such as DECIMAL, and others such as SUBSTR.

User-defined functions are functions that are registered in a database and can be used via regular data base functions and during regular database processing. Actually they offer the freedom for any type of DB-internal of DB-external processing.

A user-defined function can be external or sourced. An external function is defined to the database with a reference to an object code library and a function within that library that will be executed when the function is invoked. A sourced function is defined to the database with a reference to another built-in or user-defined function that is already known to the database.

A detailed description of user-defined functions as implemented by IBMs relational database management system DB2 can be found in 'IBM Database 2 SQL Reference—for common server', Version 2, 1995 (available through IBM branch office). Vendors of other relational database management systems may use a different term for this functionality.

Subscription can be implemented for a workflow management system that puts the audit trail into a relational database by putting a trigger on the audit trail.

The events in interest for a subscriber are specified as search conditions in the triggered action part of the trigger. Thus the search conditions operate as subscription selectors. Whenever an audit trail record is inserted into the audit trail, the relational database management system evaluates the search condition. When the search condition has evaluated to true, the appropriate audit trail is of interest to the subscriber.

The appropriate action to notify the subscriber is also made part of the triggered action part of the trigger. In the triggered action part of a trigger only SQL statements are permitted. The actual notification of the subscriber is encapsulated into a user-defined function. As the user-defined function can perform everything with the exception of SQL calls, any desired notification mechanism can be implemented within the user-defined function. It could for example be the sending of an e-mail message, the creation of a Lotus Notes document and mailing it, or even the starting of a process instance in the workflow management system via the workflow management systems application programming interface. If the audit trail does not contain sufficient information, the user-defined function could also obtain additional information from the workflow management system using for example object identifiers in the audit trail in appropriate application programming interface calls. Thus the appropriate action, in other words the subscription actuator, implements the activities to be processed, if records have been determined by the subscription selector. The subscription actuator finally generates the subscription result. The current teaching imposes no limitation on the nature of the subscription result. It may consist in just informing the subscriber on the audit record determined by the subscription implementation, it may consist in starting any type of program (including making the determined audit records available) or some other type of processing.

The use of user-defined functions is not required if the trigger allows the direct specification of pieces of software that can implement the notification mechanism.

The proposed method can even be used if the workflow management system does not store the audit trail in a relational database as long as the workflow management's audit trail can be transformed into a relational database timely.

The proposed method can also be used if the software that is used to write the audit trail supports the notion of triggers.

EXAMPLE

Suppose a manager would like to be informed immediately about all approvals of a loan when the credit amount exceeds $10,000.

Let's assume that the audit trail has the following layout as depicted in FIG. 1. According this definitions an audit trail record encompasses 7 fields, starting with the 'TIME' field in line 2 of FIG. 1 and ending with the 'USER_FIELD' in line 8 of FIG. 1.

FIG. 2 shows how a trigger is defined to support the desired subscription. The trigger is given the name SUBSCRIPTION. The audit trail table AUDIT is specified as the affected table; i.e. as the subject table (refer to line 3 in FIG. 2). The trigger event (INSERT) causes the activation of the trigger when a new record is inserted into the audit trail table (refer to line 3 in FIG. 2). The trigger is activated after (AFTER) the record is inserted into the audit trail table (refer to line 2 in FIG. 2). The trigger granularity is defined to be once per row (FOR EACH ROW) (refer to line 5 in FIG. 2); that means the trigger is potentially invoked for every audit trail record. The trigger references the set of affected rows (actually only one row) in the audit trail by defining a transition table N (REFERENCES NEW AS N) (refer to line 4 in FIG. 2).

The trigger action contains a search condition (refer to lines 6 to 8 in FIG. 2) which references columns in the inserted audit trail record to make sure that the rest of the trigger action is only performed for those audit trail records that have been written when in the loan process (MODEL_NAME='LOAN') a loan greater than 10.000 $ (USER_FIELD>10000) was approved (ACTIVITY='APPROVAL').

The actual notification mechanism for the subscriber is then encapsulated in the user-defined function SUBSCRIBE, which receives the name of the approver (N.USER), the loan amount (N.USER_FIELD), and the name of the process instance (N.INSTANCE_NAME).

FIG. 3 shows the definition of the user-defined functions SUBSCRIBE, which is called by the SQL statement section of the triggered action (refer to lines 9 to 11 in FIG. 2). Actually it defines the interface of the user-defined-function and further externals (like the method for passing variables by referring to the C-implementation approach in the current case) allowing the database system to invoke the user-defined-function passing the required information. It expects three fields as input described by their types CHAR(32) (refer to lines 1 and 3 in FIG. 3) and INTEGER (refer to line 2 in FIG. 3). The function returns an integer value (RETURNS INTEGER) (refer to line 4 in FIG. 3). Its is implemented as a program with the name SUBSCRIBE .EXE (refer to line 5 in FIG. 3). This program will be invoked, when the trigger action is executed. The implementation language is C (LANGUAGE C) (refer to line 6 in FIG. 3).

Using the audit trail as the source to implement subscriptions has two fundamental advantages.

Subscriptions can be implemented without requiring any changes to the workflow management system.

The subscriptions become effective immediately; that means even for running process instances.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A subscription-means as part of or as separate extension to a workflow-management-system (WFMS), said WFMS comprising an audit-trail of said WFMS stored within a database, said audit-trail encompassing a multitude of audit-records representing a protocol of events occurred during the execution of a process-instance of a process model by the WFMS, wherein said subscription-means comprises:

at least one subscription-monitor to autonomously process subscribed-audit-records, said subscription-monitor comprising a subscription-selector and a subscription-actuator, wherein said subscription-monitor is implemented as a database-trigger for said audit-trail and said subscription-selector is a search condition identifying said subscribed-audit-records, and wherein said subscription-actuator is processed if subscribed-audit-records have been identified.

2. The subscription-means according to claim 1, wherein said subscription-actuator processes each of said subscribed-audit-records generating the subscription-result.

3. The subscription-means according to claim 1, wherein said subscription-actuator is implemented as a user-defined-function within said database.

4. The subscription-means according to claim 1, wherein said subscription-actuator sends a message to the subscriber of the subscription-monitor and/or wherein said subscription-monitor starts a process instance within said WFMS and/or wherein said subscription-monitor starts a pre-defined program.

* * * * *